(12) United States Patent
Luan et al.

(10) Patent No.: US 12,400,058 B2
(45) Date of Patent: Aug. 26, 2025

(54) METHOD, SYSTEM, MEDIUM AND PROGRAM FOR CLOCK DESIGN OF PHYSICAL PARTITION STRUCTURE

(71) Applicant: Phytium Technology Co., Ltd., Tianjin (CN)

(72) Inventors: Xiaokun Luan, Tianjin (CN); Jianfeng Jiang, Tianjin (CN); Wei Huang, Tianjin (CN); Shaoxian Bian, Tianjin (CN); Yongfeng Sun, Tianjin (CN); Yu Deng, Tianjin (CN); Zhanzhi Chen, Tianjin (CN); Wenjiang Jin, Tianjin (CN); Cuina Wang, Tianjin (CN); Tao Tang, Tianjin (CN)

(73) Assignee: Phytium Technology Co., Ltd., Tianjin (CN)

( * ) Notice: Subject to any disclaimer, the term of this patent is extended or adjusted under 35 U.S.C. 154(b) by 808 days.

(21) Appl. No.: 17/709,359

(22) Filed: Mar. 30, 2022

(65) Prior Publication Data

US 2022/0318470 A1 Oct. 6, 2022

(30) Foreign Application Priority Data

Mar. 30, 2021 (CN) .......................... 202110343217.2

(51) Int. Cl.
*G06F 30/3312* (2020.01)
*G06F 119/12* (2020.01)

(52) U.S. Cl.
CPC ...... *G06F 30/3312* (2020.01); *G06F 2119/12* (2020.01)

(58) Field of Classification Search
USPC ........................................................ 716/103
See application file for complete search history.

(56) References Cited

U.S. PATENT DOCUMENTS

| | | | | |
|---|---|---|---|---|
| 2003/0208736 | A1* | 11/2003 | Teng | G06F 1/10 716/114 |
| 2005/0102643 | A1* | 5/2005 | Hou | G06F 1/10 716/104 |
| 2014/0337657 | A1* | 11/2014 | Watanabe | G06F 30/398 713/501 |
| 2017/0293706 | A1* | 10/2017 | Bouzouzou | G06F 30/327 |
| 2019/0121778 | A1* | 4/2019 | Felix | G06F 15/80 |
| 2022/0318470 | A1* | 10/2022 | Luan | G06F 30/396 |

FOREIGN PATENT DOCUMENTS

| | | |
|---|---|---|
| CN | 108111244 A | 6/2018 |
| CN | 110825210 A | 2/2020 |
| CN | 110995388 A | 4/2020 |

* cited by examiner

*Primary Examiner* — Mohammed Alam
(74) *Attorney, Agent, or Firm* — ANOVA LAW GROUP, PLLC

(57) ABSTRACT

A clock design method for two or more physical partition structures based on a same system clock. The method includes determining a distance of each circuit logic from the system clock; based on the distance between each circuit logic and the system clock, obtaining a plurality of clock nodes from the system clock to cause a delay of each clock node compared to the system clock to change with the distance from each circuit logic and the system clock, the greater the distance, the greater the delay; connecting each circuit logic to a corresponding clock node based on size of each circuit logic and the distance; and converging timing of each circuit logic by adjusting the delay of each clock node compared to the system clock.

18 Claims, 7 Drawing Sheets

METHOD, SYSTEM, MEDIUM AND PROGRAM FOR CLOCK DESIGN OF PHYSICAL PARTITION STRUCTURE

CROSS-REFERENCE TO RELATED APPLICATION

This application claims priority to Chinese Application No. 202110343217.2, filed on Mar. 30, 2021, the entire content of which is incorporated herein by reference.

TECHNICAL FIELD

The present disclosure relates to the field of integrated circuit design and, more specifically, to a method, system, medium and program for clock design of a physical partition structure.

BACKGROUND

Integrated circuit products have been widely used in people daily life. With the continuous development of integrate circuits, more and more functions are integrated into one chip, and the scale of integrated circuits is also increasing, which brings great challenges to integrated circuit design. In particular, integrated circuit chip designers need to consider the timing closure of the entire integrated circuit chip.

SUMMARY

In accordance with the disclosure, there is provided a clock design method for two or more physical partition structures based on a same system clock. The two or more physical partition structures include a first physical partition structure and a second physical partition structure. The first physical partition structure and the second physical partition structure include one or more circuit logics, and part of the circuit logics' logical scale in the first physical partition structure is different from the part of the circuit logics' logical scale in the second physical partition structure. Each circuit logic has its own clock tree, and a clock is configured to enter the first physical partition structure from the system clock to the second physical partition structure through the first physical partition structure. The method includes determining a distance of each circuit logic from the system clock; based on the distance between each circuit logic and the system clock, obtaining a plurality of clock nodes from the system clock to cause a delay of each clock node compared to the system clock to change with the distance from each circuit logic and the system clock, the greater the distance, the greater the delay; connecting each circuit logic to a corresponding clock node based on size of each circuit logic and the distance; and converging timing of each circuit logic by adjusting the delay of each clock node compared to the system clock.

Also, in accordance with the disclosure, there is provided a clock design system for two or more physical partition structures based on a same system clock. The two or more physical partition structures include a first physical partition structure and a second physical partition structure. The first physical partition structure and the second physical partition structure include one or more circuit logics, and part of the circuit logics' logical scale in the first physical partition structure is different from the part of the circuit logics' logical scale in the second physical partition structure. Each circuit logic has its own clock tree, and a clock is configured to enter the first physical partition structure from the system clock to the second physical partition structure through the first physical partition structure. The system includes a processor and a memory storing program instructions. When the program instructions are being executed by the processor, the program instructions cause the processor to determine a distance of each circuit logic from the system clock; based on the distance between each circuit logic and the system clock, obtain a plurality of clock nodes from the system clock to cause a delay of each clock node compared to the system clock to change with the distance from each circuit logic and the system clock, the greater the distance, the greater the delay; connect each circuit logic to a corresponding clock node based on size of each circuit logic and the distance; and converge timing of each circuit logic by adjusting the delay of each clock node compared to the system clock.

Also, in accordance with the disclosure, there is provided a computer program product. The computer program product includes a plurality of computer program codes that, when being executed by a processor, cause the processor to determine a distance of each circuit logic from the system clock; based on the distance between each circuit logic and the system clock, obtain a plurality of clock nodes from the system clock to cause a delay of each clock node compared to the system clock to change with the distance from each circuit logic and the system clock, the greater the distance, the greater the delay; connect each circuit logic to a corresponding clock node based on size of each circuit logic and the distance; and converge timing of each circuit logic by adjusting the delay of each clock node compared to the system clock.

Also, in accordance with the disclosure, there is provided a computer medium. The computer medium includes a plurality of computer program codes that, when being executed by a processor, cause the processor to determine a distance of each circuit logic from the system clock; based on the distance between each circuit logic and the system clock, obtain a plurality of clock nodes from the system clock to cause a delay of each clock node compared to the system clock to change with the distance from each circuit logic and the system clock, the greater the distance, the greater the delay; connect each circuit logic to a corresponding clock node based on size of each circuit logic and the distance; and converge timing of each circuit logic by adjusting the delay of each clock node compared to the system clock.

BRIEF DESCRIPTION OF THE DRAWINGS

To more clearly illustrate the technical solutions in the embodiments of the present disclosure, the drawings used in the description of the embodiments will be briefly described below. It is obvious that the drawings in the following description are only some embodiments of the present disclosure. For those having ordinary skills in the art, other drawings can be obtained according to these drawings without inventive efforts.

DETAILED DESCRIPTION OF THE EMBODIMENTS

In the following, specific embodiments of the present disclosure will be described in detail with reference to the accompanying drawings. Although the present disclosure will be described with reference to the specific embodiments, the present disclosure is not limited to the embodiments. Furthermore, the present disclosure includes various modifications, replacements or equivalents that are made without departing from the scope of the present disclosure as defined by the appended claims. It should be noted that, steps in the method may be implemented by any functional blocks or functional layouts, and the functional blocks or the functional layouts may be implemented as physical entities, logical entities, or combination thereof.

Chip design divides the chip into multiple physical partition structures. The physical design of all physical partition structures can be carried out at the same time, and converge at the top layer at the end. Since the physical design of each physical partition structure can be carried out independently at the same time, the timing closure of the top layer becomes very slow, especially when the respective clock trees of each physical partition structure are of different sizes, the timing of the top layer design becomes very poor. Therefore, designers have to repeatedly analyze and intervene between the bottom and top layers to balance the clock tree of the entire chip.

Figure 1:
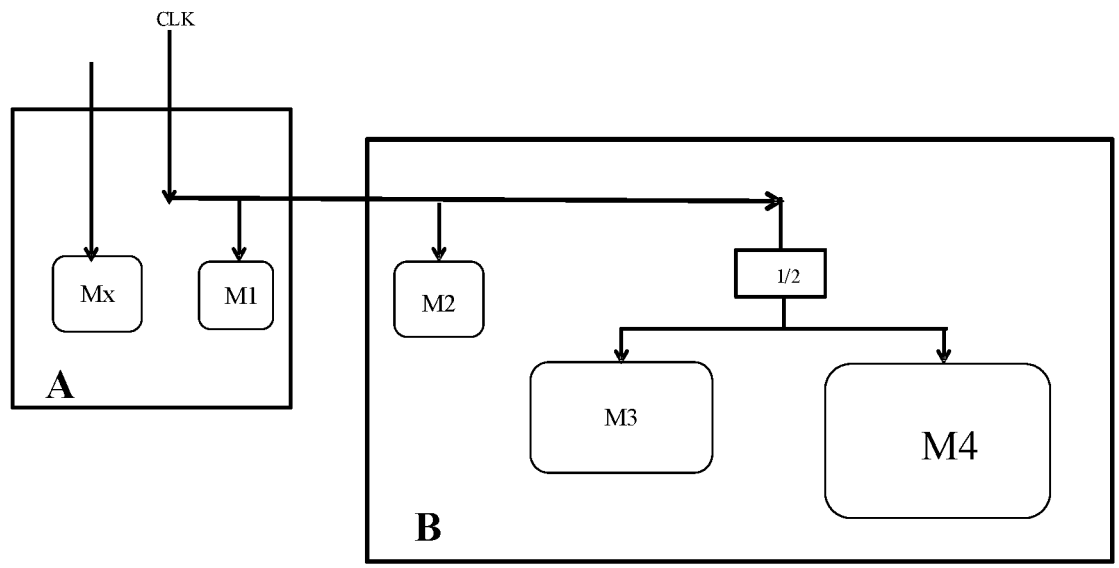
FIG. 1 shows an application scenario of a clock design method for at least two physical partition structures based on a same system clock according to an embodiment of the present disclosure.

As shown in FIG. 1, the chip design includes a physical partition structure A and a physical partition structure B. The clock CLK enters the physical partition structure B from the physical partition structure A and is divided into two channels. One channel generates a ½ frequency division, and the other channel is full frequency, and the full frequency clock is sent to the physical partition structure B. The physical partition structure A includes circuit logics Mx and M1, and the physical partition structure B includes circuit logics M2, M3 and M4. There may be a bidirectional sequential logic relationship in the circuit logics M1, M2, M3 and M4. The logical scale of the physical partition structure A and the physical partition structure B may be quite different. For example, circuit logic M1 and circuit logic M2 may have a small amount of logic, while circuit logic M3 and circuit logic M4 may have a large amount of logic. The clock trees of physical partition structure A and physical partition structure B may be designed separately and belong to the same clock domain. When designed separately, the internal timings of the physical partition structure A and the physical partition structure B are easier to converge. However, after the physical partition structure A and the physical partition structure B are combined, a large violation may occur in the timing sequence between the circuit logic M1 and the circuit logic M2.

In conventional technology, the method to solve the large violation of the timing between the circuit logic M1 and the circuit logic M2 is to make the clock pad of the circuit logic M1 longer or the clock of the circuit logic M2 shorter. However, the length of the clock pad of the circuit logic M1 cannot meet the timing because the advanced technology needs to consider the influence of the on-chip variation (OCV) of the clock. Further, if the clock of the circuit logic M2 is short, the clock deviation between the circuit logic M2 and the circuit logic M3 will also cause the timing to be unsatisfactory.

It should be noted that the circuit logic in the present disclosure may be various standard units or other logic units in an integrated circuit such as registers and flip-flops.

In view of the foregoing, the present disclosure provides a clock design method for at least two physical partition structures based on the same system clock. The at least two physical partition structures include a first physical partition structure and a second physical partition structure. The first physical partition structure and the second physical partition structure may respectively include one or more circuit logics, and the logical scale of a part of the circuit logic in the first physical partition structure may be at least different from the logical scale of a part of the circuit logic in the second physical partition structure. Each circuit logic may have its own clock tree, and the clock may enter the first physical partition structure from the system clock and enter the second physical partition structure via the first physical partition structure. The clock design method may include determining the distance of each circuit logic from the system clock; obtaining a plurality of clock nodes from the system clock based on the distance between each circuit logic and the system clock to cause the delay of each clock node compared to the system clock different with the distance from each circuit logic and the system clock, the greater the distance, the greater the delay; connecting each circuit logic to the corresponding clock node based on the size of each circuit logic and the distance; and converging the timing of each circuit logic by adjusting the delay of each clock node compared to the system clock.

The clock design method for at least two physical partition structures described above can balance the clock delay between the physical partitions by adjusting the delay of the clock node logically coupled to the circuit relative to the system clock, which eliminates the need for repeated analysis and intervention between the bottom layer and the top layer, and shortens the time it takes to achieve timing closure.

The clock design method for at least two physical partition structures based on the same system clock provided by some embodiments of the present disclosure will be described below in conjunction with FIGS. 2A, 2B and 3-8. In the embodiments shown in FIGS. 2A, 2B and 3-8, the at least two physical partition structures include a first physical partition structure and a second physical partition structure. The first physical partition structure and the second physical partition structure may respectively include one or more circuit logics, and the logical scale of a part of the circuit logic in the first physical partition structure may be at least different from the logical scale of a part of the circuit logic in the second physical partition structure. Each circuit logic may have its own clock tree, and the clock may enter the first physical partition structure from the system clock and enter the second physical partition structure via the first physical partition structure.

Figure 2A:
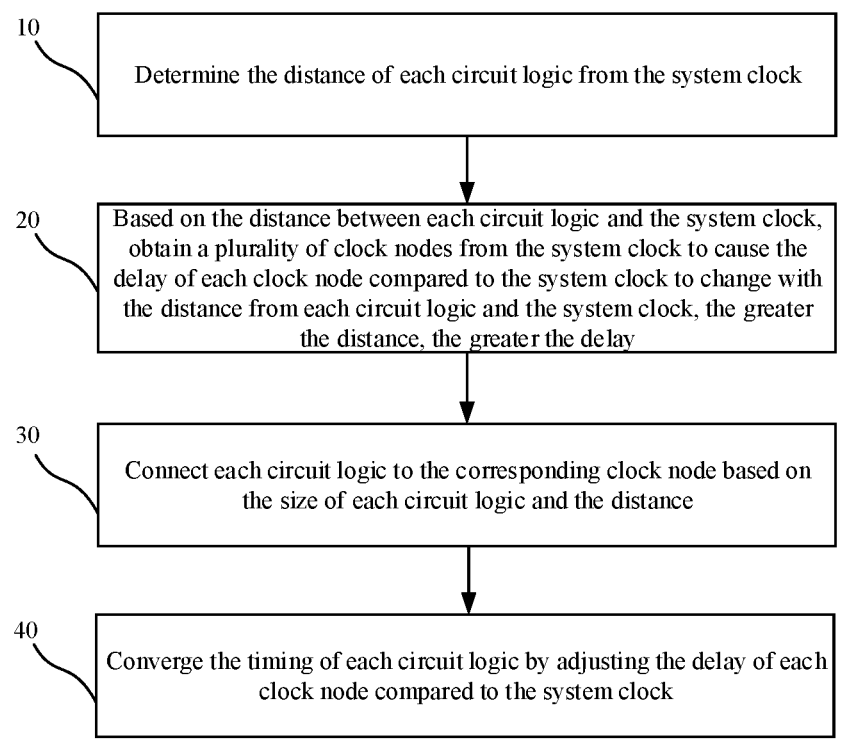
FIG. 2A is a flowchart of the clock design method for at least two physical partition structures based on the same clock system according to an embodiment of the present disclosure.

FIG. 2A is a flowchart of the clock design method for at least two physical partition structures based on the same clock system according to an embodiment of the present disclosure. The method will be described in detail below.

10, determining the distance of each circuit logic from the system clock.

20, based on the distance between each circuit logic and the system clock, obtaining a plurality of clock nodes from the system clock to cause the delay of each clock node compared to the system clock to change with the distance from each circuit logic and the system clock, the greater the distance, the greater the delay.

30, connecting each circuit logic to the corresponding clock node based on the size of each circuit logic and the distance.

40, converging the timing of each circuit logic by adjusting the delay of each clock node compared to the system clock.

In some embodiments, each circuit logic may be connected to a plurality of clock nodes. By adjusting the delay of each clock node compared to the system clock, the timing between each circuit logic may be converged, such that repeated analysis and intervention between the bottom layer and the top layer can be eliminated, thereby shortening the time consumed for achieving timing closure.

For the process at 10, the system clock may be the clock source of the clock domain in which the at least two physical partition structures are located. For example, in the scenario shown in FIG. 1, the physical partition structure A and the physical partition structure B belong to the same clock domain, which is clocked by the system clock CLK (i.e., the clock source). Therefore, the process at 10 may be to determine the distance between the circuit logic M1 in the physical partition structure A, the circuit logic M2 in the physical partition structure B, the circuit logic M3 in the physical partition structure B, and the circuit logic M4 in the physical partition structure B and the system clock CLK.

For example, the distance between the circuit logic M1 and the system clock CLK may be S1, the distance between the circuit logic M2 and the system clock CLK may be S2, the distance between the circuit logic M3 and the system clock may be S3, and the distance between the circuit logic M4 and the system clock CLK may be S4, and S1<S2<S3<S4.

In some embodiments, the distance between each circuit logic and the system clock may be determined based on the layout of the integrated circuit to which the at least two physical partition structures belong. For example, the position coordinates of each circuit logic and the system clock may be obtained from the layout of the integrated circuit, such that the distance between each circuit logic and the system clock can be determined by the position coordinates.

For the process at 20, the plurality of clock nodes may be determined from the signal transmission paths of the system clock, which may include signals lines and devices (e.g., buffers, etc.) located on the signal lines. The plurality of clock nodes may correspond to respective circuit logics, and the delay of each clock node compared to the system clock may be related to the distance from the circuit logic corresponding to each clock node to the system clock. For example, the longer the distance from the circuit logic corresponding to each clock node to the system clock, the longer the delay of each clock node compared to the system clock.

In the scenario shown in FIG. 1, four clock nodes may be determined from the signal transmission paths of the system clock, and the four clock nodes may correspond to the circuit logic M1, circuit logic M2, circuit logic M3 and circuit logic M4 respectively. Further, the delay of each of the four clock nodes compared to the system clock may be proportional to the distance from the circuit logic corresponding to the four clock nodes to the system clock. For example, if S1<S2<S3<S4, then the delay of the clock node corresponding to the circuit logic M1 compared to the system clock is smaller than the delay of the clock node corresponding to the circuit logic M2 compared to the system clock, the delay of the clock node corresponding to the circuit logic M2 compared to the system clock is smaller than the delay of the clock node corresponding to the circuit logic M3 compared to the system clock, and the delay of the clock node corresponding to the circuit logic M3 compared to the system clock is smaller than the delay of the clock node corresponding to the circuit logic M4 compared to the system clock.

For the process at 30, each circuit logic may be connected to the clock node corresponding to the circuit logic. That is, each circuit logic can be connected to teach clock node based on the distance from each circuit logic to the system clock. For example, a circuit logic that is closer to the system clock may be connected to a clock node with less delay compared to the system clock, and conversely, a circuit logic that is farther away from the system clock may be connected to a clock node with a greater delay compared to the system clock.

Of course, the above example only shows the schematic diagram of four circuit logics in two physical partition structures, but in practice, there may be more than two physical partition structures, and the clock may go from one physical partition structure to another physical partition structure, and then to the next physical partition structure, etc. In addition, there may be more or less than four circuit logics in each physical partition structure. The present disclosure can be applied to those situations, and the principle is to uniformly set clock nodes with different delays from a plurality of circuit logics in a plurality of physical partition structures. In the present disclosure, various embodiments of the present disclosure will be described with four circuit logics in two physical partition structures, but this is not a limitation.

Figure 2B:
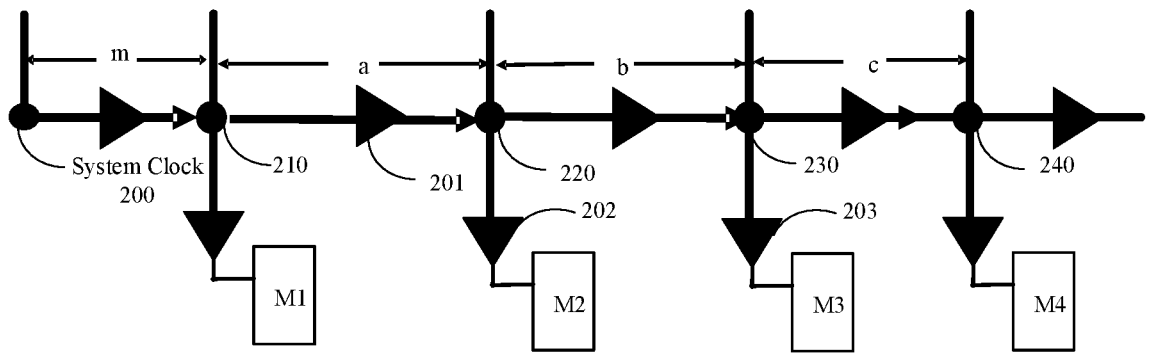
FIG. 2B is a schematic diagram showing a clock tree structure obtained based on processes at 20 and 30 according to an embodiment of the present disclosure.

FIG. 2B is a schematic diagram showing a clock tree structure obtained based on processes at 20 and 30 according to an embodiment of the present disclosure.

It should be noted that the schematic diagram of the clock tree structure shown in FIG. 2B can be obtained by taking the scenario shown in FIG. 1 as an example, but this does not mean that the clock design method provided in the embodiments of the present disclosure is only applicable to the scenario shown in FIG. 1. On the contrary, the clock design method provided in the embodiments of the present disclosure may be applicable to any scenario of clock design for at least two physical partition structures based on the same system clock. The example shown in FIG. 1 and FIG. 2B are only to better clarity the spirit of the clock design method provided in the embodiments of the present disclosure.

As shown in FIG. 2B, the clock source of the clock tree structure is a system clock 200. In the scenario shown in FIG. 1, four circuit logics M1 to M4 are included. Therefore, four clock nodes are determined from the signal lines of the system clock 200, which are clock node 210, clock node 220, clock node 230 and clock node 240 respectively.

The clock node 210 may correspond to the circuit logic M1, the clock node 220 may correspond to the circuit logic M2, the clock node 230 may correspond to the circuit logic M3, and the clock node 240 may correspond to the circuit logic M4.

Since the distance between the circuit logic M1 and the system clock 200 is smaller than the distance between the circuit logic M2 and the system clock 200, the distance between the circuit logic M2 and the system clock 200 is smaller than the distance between the circuit logic M3 and the system clock 200, and the distance between the circuit logic M3 and the system clock 200 is smaller than the distance between the circuit logic M4 and the system clock 200, therefore, the distances from the clock node 210, the clock node 220, the clock node 230 and the clock node 240 to the system clock 200 may be increased in sequence. For example, as shown in FIG. 2B, the delay m of the clock node 210 compared to the system clock 200 is smaller than the delay (m+a) of the clock node 220 compared to the system clock 200, the delay (m+a) of the clock node 220 compared to the system clock 200 is smaller than the delay (m+a+b) of the clock node 230 compared to the system clock 200, and the delay (m+a+b) of the clock node 230 compared to the system clock 200 is smaller than the delay (m+a+b+c) of the clock node 240 compared to the system clock 200. It should be understood that a, b and c are all greater than 0, m is greater than or equal to 0, and all represent a length of time of the delay. In one case, m may be equal to 0, that is, the first clock node may be the system clock itself.

After a plurality of clock nodes are determined from the signal lines of the system clock 200, each circuit logic may be logically connected to the corresponding clock nodes.

For example, circuit logic M1 may be connected to the clock node 210, circuit logic M2 may be connected to the system clock 200, circuit logic M3 may be connected to the clock node 230, and circuit logic M4 may be connected to the clock node 240 to receive clocks from the respective clock nodes.

For the process at 40, the delay of the clock node 220 compared to the system clock 200 may be adjusted to allow timing between the circuit logic M2 and the M1 to converge, the delay of the clock node 230 compared to the system clock 200 may be adjusted to allow the timing between the circuit logic M3 and the circuit logic M2 to converge, and the delay of the clock node 240 compared to the system clock 200 may be adjusted to allow the timing between the circuit logic M3 and the circuit logic M4 to converge It should be noted that although in the above embodiments, four circuit logics are used as an example to illustrate the implementation of the embodiments of the present disclosure, the present disclosure is not limited to at least two physical partition structures including four circuit logics. In fact, the number of circuit logics included in at least two physical partition structures of an integrated circuit is often greater than four or less than or equal to four.

In some embodiments, the change of the delay of each clock node compared to the system clock may be realized by changing a number of buffers inserted between the system clock and each clock node or an adjustment value of a clock regulator inserted between the system clock and the clock node.

For the process at 40, for example, when the data path of the circuit logic has been optimized, the timing of each circuit logic may be converged by adjusting the delay of each clock node compared to the system clock.

In some embodiments, the process of making the timing of each circuit logic to converge by adjusting the delay of each clock node compared to the system clock may include selecting a path with timing violations in a plurality of circuit logic and determining the circuit logic associated with the path, determining a duration of the setup time violation for the path, and adjusting the delay between the respective clock nodes of the circuit logic associated with the path, or adjusting the clock delay at the respective clock nodes of the circuit logic associated with the path based on the duration of the setup time violation.

In some embodiments, adjusting the delay between the respective clock nodes of the circuit logic associated with the path, or adjusting the clock delay at the respective clock nodes of the circuit logic associated with the path based on a duration t1 of the setup time violation may include adjusting the delay between the respective clock nodes of at least part of the circuit logic associated with the path, or adjusting the clock delays at the respective clock nodes of the circuit logic associated with the path when the duration t1 of the setup time violation is less than or equal to a duration of one clock cycle of the system clock, and adjusting the clock delays at the respective clock nodes of at least part of the circuit logic associated with the path when the duration t1 of the setup time violation is greater than or equal to one clock cycle of the system clock.

For example, in the scenario shown in FIG. 2B, when the data path from the first circuit logic M1 to the second circuit logic M2 has been optimized, if it is determined that the duration t1 of the setup time violation of a path from the first circuit logic M1 to the second circuit logic M2 of the timing violation is less than the duration of one clock cycle of the system clock, then a delay a between the clock node 210 corresponding to the circuit logic M1 and the clock node 220 corresponding to the circuit logic M2 may be adjusted, or the clock delay at the clock node of the second circuit logic may be adjusted. When the data path from the first circuit logic M1 to the second circuit logic M2 has been optimized, if it is determined that the duration t1 of the setup time violation of a path from the first circuit logic M1 to the second circuit logic M2 of the timing violation is greater than the duration of one clock cycle of the system clock, the clock delay at the clock node 210 of the first circuit logic M1 may be adjusted. Adjusting the clock delay at the clock node 210 of the first circuit logic M1 may be adjusting the delay between the clock node 210 corresponding to the first circuit logic M1 and the first logic circuit M1.

In some embodiments, adjusting the delay between the respective clock nodes of the circuit logic associated with the path based on the duration of the setup time violation may include increasing the delay between the respective clock nodes of the circuit logic associated with the path, or reducing the delay between the clock nodes corresponding tot eh circuit logic associated with the path based on the duration of the setup time violation.

For example, the at least two physical partition structures may include N circuit logics arranged in chronological order, where N may be an integer greater than 1. For example, the N circuit logics arranged in chronological order may respectively be the first circuit logic, the second circuit logic, . . . the Nth circuit logic, that is, the clock signal may pass through the first circuit logic, the second circuit logic, . . . the Nth circuit logic for transmission. In the N circuit logics, the kth circuit logics (including the kth circuit logic) whose timing sequence is located before the kth circuit logic may belong to the first physical partition structure, and k may be an integer greater than or equal to 1 and less than N. Other circuit logics in the N circuit logics except the kth circuit logics whose timing sequence is located before the kth circuit logic may belong to the second physical partition structure.

In the above scenario, when the data path from the kth circuit logic to the k+1th circuit logic has been optimized, if a timing violation occurs in the timing path from the kth circuit logic to the k+1th circuit logic (i.e., the data signal is transmitted from the kth physical partition structure to the k+1th circuit logic), a path from the kth circuit logic to the timing violation of the k+1th circuit logic may be selected, the duration t1 of the setup time violation of the path may be determined, and the delay between the clock node of the kth circuit logic and the clock node of the k+1th circuit logic may be increased by t1 or the clock at the clock node at the k+1th circuit logic may be increased by the delay t1.

In addition, in order to make the timing between other circuit logics located after the k+1th circuit logic to converge, the delays of the clock nodes corresponding to the other circuit logics located after the k+1th circuit logic may also need to be adjusted accordingly. That is, after the adjustment of the timing violation path from the kth circuit logic to the k+1th circuit logic is completed, the clock design method may further include, for the case of selecting a path from the kth circuit logic to the k+1th circuit logic with a timing violation, starting from the k+1th circuit logic, sequentially selecting a path with timing violations in two adjacent circuit logics; for each path of a timing violation in two adjacent circuit logics, based on the duration t1 of the setup time violation, increasing the delay between the clock node of the kth circuit logic and the clock node of the k+1th circuit logic by t1 or increasing the clock at the clock node at the k+1th circuit logic by a delay t1.

For example, a path from the clock node of the k+1th circuit logic to the timing violation in the k+2th circuit logic can be selected, and the delay between the clock node of the k+1th circuit logic and the clock node of the k+2th circuit logic can be increased by t1 or the clock at the clock node of the k+2th circuit logic can be increased by t1, . . . the delay between the clock node of the N−1th circuit logic and the clock node of the Nth circuit logic can be increased by t1 or the clock at the clock node of the Nth circuit logic can be increased by t1.

Similarly, when the data path from the k+1th circuit logic to the kth circuit logic has been optimized, if a timing violation occurs in the timing path from the k+1th circuit logic to the kth circuit logic (i.e., the data signal is transmitted from the k+1th circuit logic to the kth circuit logic), a path from the kth circuit logic to the timing violation of the k+1th circuit logic may be selected, a duration t2 of the setup time violation of the path may be determined, and the delay between the clock node of the kth circuit logic and the clock node of the k+1th circuit logic may be reduced by t2, or the clock at the clock node at the kth circuit logic may be increased by a delay t2. In addition, in order to make the timing between other circuit logics located after the k+1th circuit logic to converge, the delays of the clock nodes corresponding to the other circuit logics located after the k+1th circuit logic may also need to be adjusted accordingly. For example, after the adjustment of the timing violation path from the k+1th circuit logic to the kth circuit logic is completed, the clock design method may further include, for each path of a timing violation in two adjacent circuit logics, based on the duration t2 of the setup time violation, reducing the delay between the clock node of the kth circuit logic and the clock node of the k+1th circuit logic by t2 or increasing the clock at the clock node at the kth circuit logic by a delay t1.

It should be noted that although the clock design method is described above in the case where the data path of the circuit logic has been optimized, the clock design method of the present disclosure is not limited to the case where the data path has been optimized. Rather, the clock design method of the present disclosure can be applied in any situation at the will of the clock designer.

In order to explain the foregoing embodiments more clearly, the implementation of the process at 40 will be further described below with reference to the scenarios shown in FIG. 1, FIG. 2B and FIG. 3.

Figure 3:
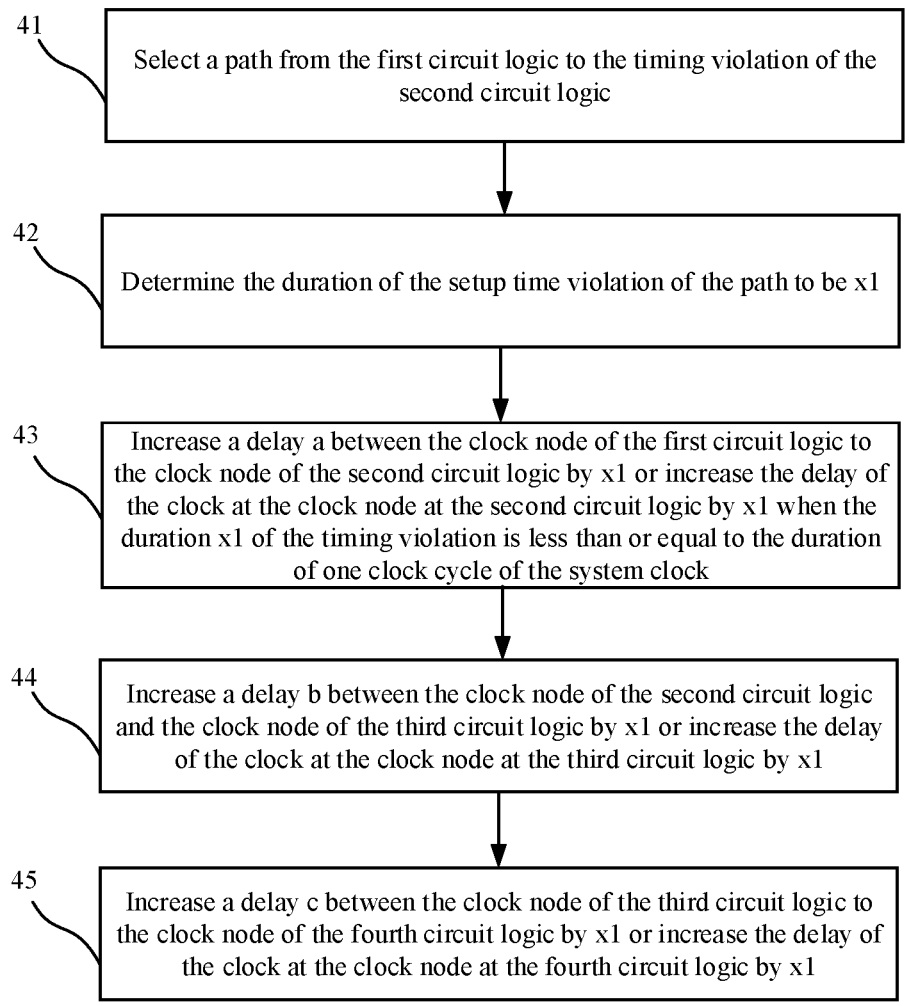
FIG. 3 is a flowchart of the method of the process at 40 according to an embodiment of the present disclosure.

FIG. 3 is a flowchart of the method of the process at 40 according to an embodiment of the present disclosure. As shown in FIG. 3, the process at 40 can include processes 41-45.

In the process at 41, a path from the first circuit logic to the timing violation of the second circuit logic may be selected.

In some embodiments, each circuit logic may include a first circuit logic, a second circuit logic, a third circuit logic and a fourth circuit logic arranged in sequential order. For example, the clock signal may pass through the first circuit logic, the second circuit logic, the third setup time violation and the fourth circuit logic in sequence.

For example, by implementing the process at 41, a path in which the data signal is transmitted from the first circuit logic to the timing violation of the second circuit logic may be selected.

The process at 41 will be described below with reference to FIG. 1. As shown in FIG. 1, the first physical partition structure A and the second physical partition structure B include the first circuit logic M1, the second circuit logic M2, the third circuit logic M3 and the fourth circuit logic M4 arranged in sequential order. The first circuit logic M1 is located in the first physical partition structure A, and the second circuit logic M2, the third circuit logic M3 and the fourth circuit logic M4 are located in the second physical partition structure B. After the first physical partition structure A and the second circuit logic B are combined, the timing paths from the first circuit logic M1 to the second circuit logic M2 are prone to timing violations.

For the process at 41, for example, a path from the first circuit logic M1 to the second circuit logic M2 where a timing violation occurs may be selected, that is, a path where a timing violation occurs in the transmission of the data signal from the first circuit logic M1 to the second circuit logic M2.

For example, a gate-level design file (such as a .ddc file) created by a design compiler (DC) can be read to obtain a path with timing violations from the gate-level design file.

In the process at 42, the duration of the setup time violation of the path may be determined to be x1.

For example, the gate-level design file can be read, and the duration x1 of the setup time violation of the path can be determined from the gate-level design file, where x1 may be the length of time.

The duration of the setup time violation of the path may refer to the length of time that the actual time when the valid edge (such as a rising edge or a falling edge) of the clock signal reaches the second circuit logic M2 is earlier than the time when the rising or falling edge of the clock signal reaches the second circuit logic M2 that meets the requirement of timing closure. Meeting the requirement of timing closure may be that the time when the data signal arrives at the second circuit logic M2 is earlier than the time at which the clock signal arrives at the second circuit logic M2 by at least a length of a setup time. Therefore, the clock signal reaching the second circuit logic M2 may need to be delayed or the time when the data signal reaches the second circuit logic M2 may need to be advanced.

In the process at 43, when the duration x1 of the timing violation is less than or equal to the duration of one clock cycle of the system clock, the delay a between the clock node of the first circuit logic of the clock node of the second circuit logic may be increased by x1 or the delay of the clock at the clock node at the second circuit logic may be increased by x1, where a is the length of time.

As shown in FIG. 2B, the system clock 200 sequentially transmits the clock signal to the clock node 210, the clock node 220, the clock node 230 and the clock node 240 through the signal transmission path. Since every two adjacent clock nodes need to be transmitted through a signal transmission path, there may be a delay in the clock signal between every two adjacent clock nodes. For example, there may be a delay a between the clock node 210 of the first circuit logic M1 and the clock node 220 of the second circuit logic M2.

For the process at 43, in some embodiments, the timing closure may be achieved by adjusting the delay a between the clock node 210 of the first circuit logic M1 and the clock node 220 of the second circuit logic M2. For example, if it is determined in the process at 42 that the setup time violation duration is x1, the clock signal reaching the second circuit logic M2 may need to be delayed by x1, such that the delay a between the clock node 210 of the first circuit logic M1 and the clock node 220 of the second circuit logic M2 can be increased by x1, that is, the delay time becomes a+x1.

In some embodiments, the number of buffers 201 between the clock node 210 of the first circuit logic M1 and the clock node 220 of the second circuit logic M2 may be increased. In this way, the delay a between the clock node 210 of the first circuit logic M1 and the clock node 220 of the second circuit logic M2 can be increased by x1, that is, the delay between the clock node 210 and the clock node 220 becomes a+x1.

By adjusting the delay between the clock node 210 of the first circuit logic M1 and the clock node 220 of the second circuit logic M2, the timing of all paths between the first circuit logic M1 and the second circuit logic M2 whose setup time violation duration is less than or equal to x1 can be closed. In this way, there is no need to adjust the timing of each path separately, thereby achieving the effect of shortening the time consumed for timing closure.

For the process at 43, in some embodiments, a delay x1 may be added to the clock at the clock node at the second circuit logic M2 to achieve timing closure between the first circuit logic M1 and the second circuit logic M2. For example, a delay x1 may be added to the clock at the clock node 220 of the second circuit logic M2 to achieve timing closure between the first circuit logic M1 and the second circuit logic M2. Increasing the delay of the clock at the clock node 220 of the second circuit logic M2 may be increasing the delay between the second circuit logic M2 and the clock node 220 of the second circuit logic M2. That is, timing closure can be achieved by adjusting the delay between the circuit logic and the clock node of the circuit logic. For example, the number of buffers 202 may be increased between the second circuit logic M2 and the clock node 220 of the second circuit logic M2 to increase the clock at the clock node at the second circuit logic M2 by a delay x1.

In this embodiment, the timing sequence of a single circuit logic may be adjusted in a targeted manner without affecting the timing sequence of other circuit logics.

In the process at 43, when the duration x1 of the timing violation is less than or equal to the duration of one clock cycle of the system clock, the delay of the clock node of the second circuit logic compared to the system clock may be adjusted by increasing the delay a from the clock node of the first circuit logic to the clock node of the second circuit logic by x1 or by increasing the clock at the clock node at the second circuit logic by x1.

In some embodiments, since the delay of the clock node 220 compared to the system clock 200 is adjusted, the timing between the subsequent clock nodes may be changed by x1. For example, the timing between the clock node of the second circuit logic and the third circuit logic may be changed by x1. Therefore, the timing between the subsequent clock nodes may need to be adjusted. In some embodiments, the processes at 44 and 45 may need to be performed to adjust the timing between subsequent clock nodes.

In the process at 44, a delay b between the clock node of the second circuit logic and the clock node of the third circuit logic may be increased by x1 or the delay of the clock at the clock node at the third circuit logic may be increased by x1, where b may be a length of time.

In some embodiments, the delay b between the clock node 220 of the second circuit logic M2 and the clock node 230 of the third circuit logic M3 may be increased by x1. That is, the delay between the clock node 220 and the clock node 230 may become b+x1. For example, the number of buffers inserted between the clock node 220 of the second circuit logic M2 and the clock node 230 of the third circuit logic M3 may be increased or the adjustment value of a clock adjuster between the clock node 220 and the clock node 230 may be adjusted, thereby increasing the delay b of the clock node 220 and the clock node 230 by x1. In other embodiments, a delay x1 may be added to the clock at the clock node 230 of the third circuit logic M3. For example, a delay x1 may be added to the clock at the clock node at the third circuit logic M3 by increasing the number of buffers 203 inserted between the third circuit logic M3 and the clock node 230 of the third circuit logic M3 or by adjusting the adjustment value of the clock adjuster between the third circuit logic M3 and the clock node 230.

In the process at 45, a delay c from the clock node of the third circuit logic to the clock node of the fourth circuit logic may be increased by x1 or the delay at the clock at the clock node at the fourth circuit logic may be increased by x1, where c is a length of time.

In some embodiments, the delay c between the clock node 230 of the third circuit logic M3 and the clock node 240 of the fourth circuit logic M4 may be increased by x1. That is, the delay between the clock node 230 and the clock node 240 may become c+x1. For example, the number of buffers inserted between the clock node 230 and the clock node 240 may be increased, thereby increasing the delay c between the clock node 230 and the clock node 240 by x1. In other embodiments, a delay x1 may be added to the clock at the clock node 240 of the fourth circuit logic M4. For example, a delay x1 may be added to the clock at the clock node at the fourth circuit logic M4 by increasing the number of buffers inserted between the fourth circuit logic M4 and the clock node 240 of the fourth circuit logic M4 or by adjusting the adjustment value of the clock adjuster.

In some embodiments, after the adjustment of the path of the timing violation from the kth circuit logic to the k+1th circuit logic is completed, the path of the timing violation from the k+1th circuit logic to the k+2th circuit logic may be further adjusted. For example, in the scenario shown in FIG. 2B, after the timing violation path from the first circuit logic M1 to the second circuit logic M2 is completely adjusted based on the method described in FIG. 3, the timing violation path between the second circuit logic M2 and the third circuit logic M3 may be further adjusted.

Figure 4:
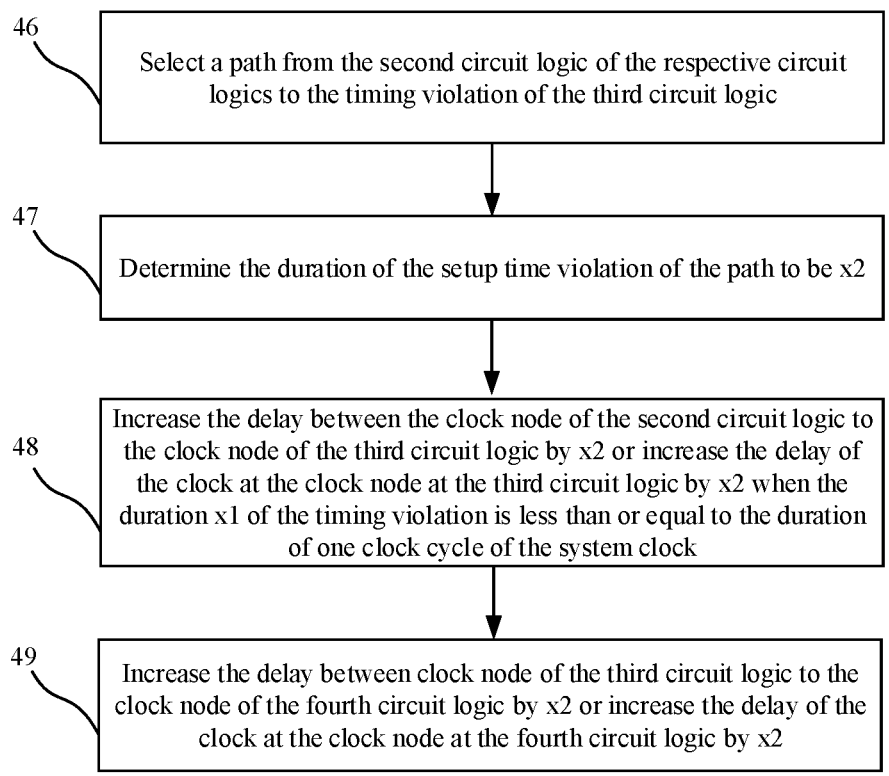
FIG. 4 is a flowchart of the method of the process at 40 according to an embodiment of the present disclosure.

FIG. 4 is a flowchart of the method of the process at 40 according to an embodiment of the present disclosure.

As shown in FIG. 4, in addition to the processes of 41-45 shown in FIG. 3, the process at 40 may further include processes 46-49. In some embodiments, the processes 46-49 may be performed after the process at 45.

In the process at 46, a path from the second circuit logic of the respective circuit logics to the timing violation of the third circuit logic may be selected.

For example, in the scenario shown in FIG. 2B, a path from the second circuit logic M2 to the timing violation of the third circuit logic M3 may be selected. For example, a gate-level design file (e.g., a .ddc file) created by DC may be read to obtain a path from the second circuit logic M2 to the third circuit logic M3 with a timing violation from the gate-level design file.

In the process at 47, the duration of the setup time violation of the path may be determined to be x2, x2 being a length of time.

The process at 47 is similar to the process at 42 in FIG. 3, and details will not be repeated here.

In the process at 48, when the duration x2 of the timing violation is less than or equal to the duration of one clock cycle of the system clock, the delay from the clock node of the second circuit logic to the clock node of the third circuit logic may be increased by x2 or the delay of the clock at the clock node at the third circuit logic may be increased by x2.

For example, as shown in FIG. 2B, there is a delay b between the clock node 220 of the second circuit logic M2 and the clock node 230 of the third circuit logic M3.

For the process at 48, in some embodiments, the timing closure may be achieved by adjusting the delay b between the clock node 220 of the second circuit logic M2 and the clock node 230 of the third circuit logic M3. For example, if the setup time violation duration of the timing path from the clock node 220 of the second circuit logic M2 to the third circuit logic M3 is x2, then the clock signal reaching the third circuit logic M3 need to be delayed by x2. Therefore, the delay b between the clock node 220 of the second circuit logic M2 and the clock node 230 of the third circuit logic M3 may be increased by x2, that is, the delay between the clock node 220 and the clock node 230 becomes b+x1+x2. In some embodiments, a buffer inserted between the clock node 220 of the second circuit logic M2 and the clock node 230 of the third circuit logic M3 may be added or the adjustment value of the clock adjuster may be adjusted to increase the delay b by x2.

For the process at 48, in other embodiments, the clock at the clock node at the third circuit logic M3 may be increased by a delay x2. For example, a delay x2 may be added to the clock between the third circuit logic M3 and the clock node 230 corresponding to the third circuit logic M3 to increase the clock at the clock node at the third circuit logic M3 by x2.

In the process at 49, the delay between the clock node of the third circuit logic and the clock node of the fourth circuit logic may be increased by x2 or the clock at the clock node of the fourth circuit logic may be increased by x2.

In some embodiments, the delay c between the clock node 230 of the third circuit logic M3 and the clock node 240 of the fourth circuit logic M4 may be increased by x2, that is, the delay between the clock node 230 and the clock node 240 becomes c+x1+x2. Alternatively, a delay x2 may be added to the clock at the clock node 240 of the fourth circuit logic M4. For example, a delay x2 may be added to the clock between the fourth circuit logic M4 and the clock node 240.

In some embodiments, after the path adjustment for the timing violation from the k+1th circuit logic to the k+2th circuit logic is completed, the path of the timing violation from the k+2th circuit logic to the k+3th circuit logic, and the subsequent circuit logics may be further adjusted until the timing violation path adjustment between all circuit logics is completed. For example, in the scenario shown in FIG. 2B, after the path adjustment for the timing violation between the second circuit logic M2 and the third circuit logic M3 is completed based on the method described in FIG. 4, a path of the timing violation between the third circuit logic M3 and the fourth circuit logic M4 may be further adjusted.

Figure 5:
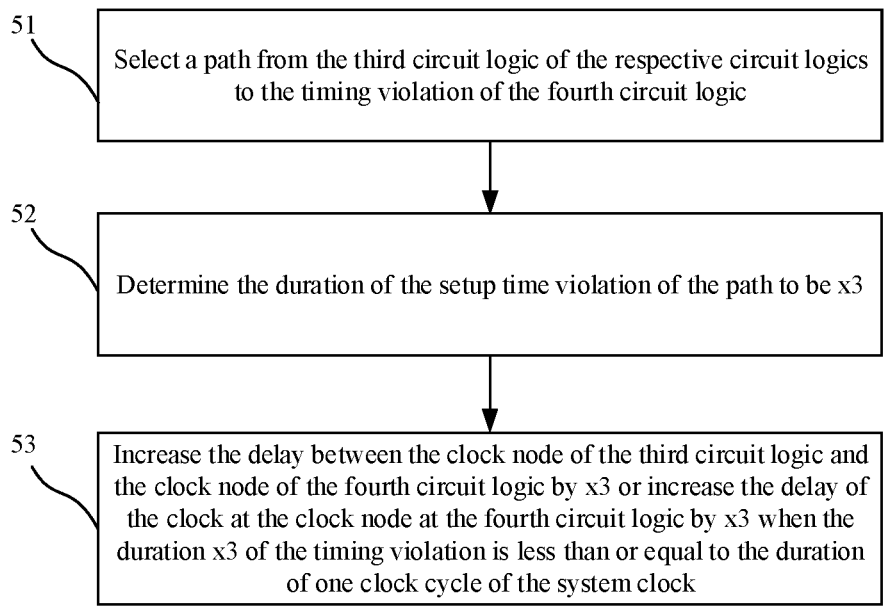
FIG. 5 is a flowchart of the method of the process at 40 according to an embodiment of the present disclosure.

FIG. 5 is a flowchart of the method of the process at 40 according to an embodiment of the present disclosure.

As shown in FIG. 5, in addition to the embodiment shown in FIG. 4, the process at 40 may further include processes 51-53. In some embodiments, the processes 51-53 may be performed after the process at 49.

In the process at 51, a path from the third circuit logic of the respective circuit logics to the timing violation of the fourth circuit logic may be selected.

For example, in the scenario shown in FIG. 2B, a path from the third circuit logic M3 to the timing violation of the fourth circuit logic M4 may be selected. For example, a gate-level design file (e.g., a .ddc file) created by DC may be read to obtain a path from the third circuit logic M3 to the fourth circuit logic M4 with a timing violation from the gate-level design file.

In the process at 52, the duration of the setup time violation of the path may be determined to be x3, x3 being a length of time.

The process at 52 is similar to the process at 47 in FIG. 4, and details will not be repeated here.

In the process at 53, when the duration x3 of the timing violation is less than or equal to the duration of one clock cycle of the system clock, the delay from the clock node of the third circuit logic to the clock node of the fourth circuit logic may be increased by x3 or delay of the clock at the clock node at the fourth circuit logic may be increased by x3.

For example, as shown in FIG. 2B, there is a delay c between the clock node 230 of the third circuit logic M3 and the clock node 240 of the fourth circuit logic M4.

For the process at 53, in some embodiments, the timing closure may be achieved by adjusting the delay c between the clock node 230 of the third circuit logic M3 and the clock node 240 of the fourth circuit logic M4. For example, if the setup time violation duration of the timing path from the clock node 230 of the third circuit logic M3 to the fourth circuit logic M4 is x3, then the clock signal reaching the fourth circuit logic M4 needs to be delayed by x3. Therefore, a delay c between the clock node 230 of the third circuit logic M3 and the clock node 240 of the fourth circuit logic M4 may be increased by x3, that is, the delay between the clock node 230 and the clock node 240 becomes c+x1+x2+x3.

For the process at 53, in other embodiments, the clock at the clock node at the fourth circuit logic M4 may be increased by a delay x3. For example, the clock at the clock node at the fourth circuit logic M4 may be increased by a delay x3 by adding a delay x3 to the clock between the fourth circuit logic M4 and the clock node 240 of the fourth circuit logic M4. That is, timing closure can be achieved by adjusting the delay between the circuit logic and the clock node corresponding to the circuit logic.

For the details of the process at 53, reference can be made to the process at 49 described in FIG. 4, which will not be repeated here.

In other embodiments, if the duration x1 of the time violation determined in the process at 42 of FIG. 3 is greater than the duration of one clock cycle of the system clock, then the clock at the clock node at the second circuit logic may be increased by a delay x1, the clock at the clock node at the third circuit logic may be increased by a delay x1, and the clock at the clock node at the fourth circuit logic may be increased by a delay x1.

For example, if the duration x1 of the time violation is greater than the duration of one clock cycle of the system clock, a delay x1 may be applied for the clock path where each circuit logic is located. For example, adding a delay x1 to the clock at the clock node at the second circuit logic may be adding a delay x1 to the clock signal between the clock node 220 and the second circuit logic M2. Similarly, adding a delay x1 to the clock at the clock node at the third circuit logic may be adding a delay x1 to the clock signal between the clock node 230 and the third circuit logic M4. Similarly, a delay x1 may be added to the clock at the clock node at the fourth circuit logic, and details will not be repeated here.

In other embodiments, if it is determined at the process at 47 of FIG. 4 that x2 is greater than the duration of one clock cycle of the system clock, the clock at the clock node at the third circuit logic may be increased by a delay x2, and the clock at the clock node at the fourth circuit logic may be increased by a delay x2.

In other embodiments, if it is determined at the process at 52 of FIG. 5 that x3 is greater than the duration of one clock cycle of the system clock, the clock at the clock node at the fourth circuit logic may be increased by a delay x3.

Figure 6:
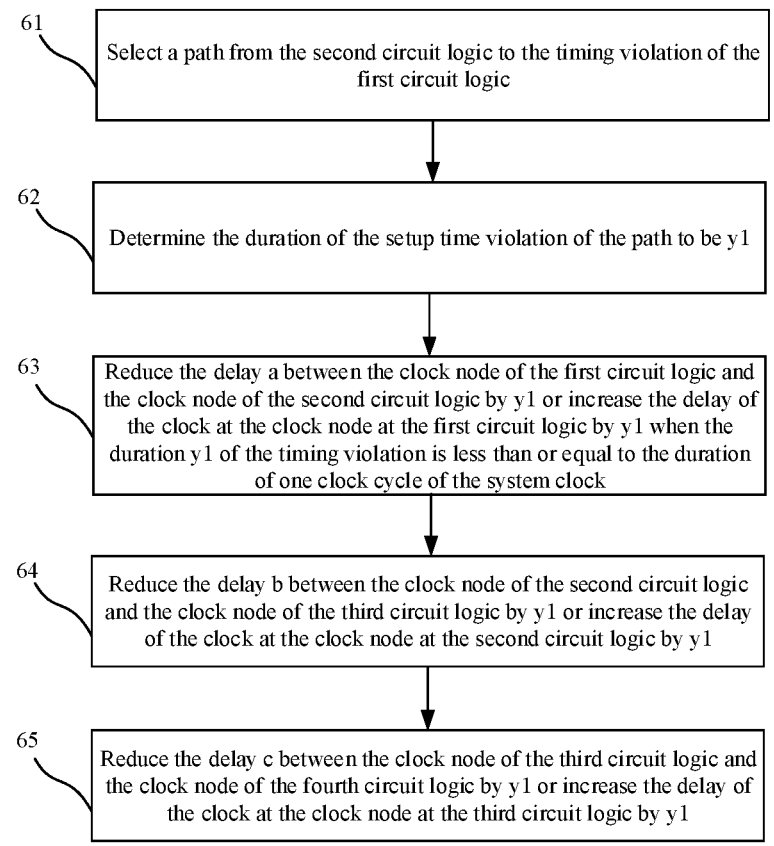
FIG. 6 is a flowchart of the method of the process at 40 according to an embodiment of the present disclosure.

The following describes a flowchart of a method for designing time violations in a timing path from the k+1th circuit logic to the kth circuit logic (i.e., the data signal is transmitted from the k+1th circuit logic to the kth circuit logic) according to an embodiment of the present disclosure with reference to FIG. 6.

FIG. 6 is a flowchart of the method of the process at 40 according to an embodiment of the present disclosure.

As shown in FIG. 6, the process at 40 may include processes 61-65.

In the process at 61, a path from the second circuit logic to the timing violation of the first circuit logic may be selected.

In some embodiments, each circuit logic may include a first circuit logic, a second circuit logic, a third circuit logic and a fourth circuit logic arranged in sequential order. For example, the clock signal may pass through the first circuit logic, the second circuit logic, the third setup time violation and the fourth circuit logic in sequence.

In some embodiments, the process at 61 may be to select a path in which a timing violation occurs when the data signal is transmitted from the second circuit logic to the first circuit logic. For example, in the scenario shown in FIG. 2B, a path of the data signal from the second circuit logic M1 to the first circuit logic M1 with a timing violation can be selected.

For example, a gate-level design file (such as a .ddc file) created by DC may be read to obtain a path from the gate-level design file with timing violations.

In the process at 62, the duration of the setup time violation of the path may be determined to be y1.

For example, the gate-level design file may be read and the duration y1 of the setup time violation of the path may be determined from the gate-level design file, y being a length of time.

In the process at 63, when the duration y1 of the timing violation is less than or equal to the duration of one clock cycle of the system clock, a delay a between the clock node of the first circuit logic and the clock node of the second circuit logic may be reduced by y1 or the delay of the clock at the clock node at the first circuit logic may be increased by y1.

In some embodiments, if the duration y1 of the timing violation is less than or equal to the duration of one clock cycle of the system clock, the delay a between the clock node 210 of the first circuit logic M1 and the clock node 220 of the second circuit logic M2 may be reduced by y1, that is, the delay between the clock node 210 and the clock node 220 becomes a−y1. In this way, the system clock may arrive at the second circuit logic M2 in advance by y1, such that the data signal sent by the second circuit logic M2 to the first circuit logic M1 can arrive at the first circuit logic M1 in advance by y1, thereby realizing timing closure from the second circuit logic M2 to the first circuit logic M1.

In other embodiments, if the duration y1 of the timing violation is less than or equal to the duration of one clock cycle of the system clock, a delay y1 may be added to the clock at the clock node 210 at the first circuit logic M1 to delay the clock signal reaching the first circuit logic M1 to delay the clock signal arriving at the first circuit logic M1, thereby realizing the timing closure from the second circuit logic M2 to the first circuit logic M1. For example, a delay y1 may be added to the clock at the clock node at the first circuit logic M1 by adding a delay y1 to the clock between the first circuit logic M1 and the clock node 210 corresponding to the first circuit logic M1. For example, the number of buffers inserted between the first circuit logic M1 and the clock node 210 may be increased, or the adjustment value of the clock adjuster located between the first circuit logic M1 and the clock node 210 may be adjusted to increase the delay y1.

In some embodiments, since the delay of the clock node 220 compared to the system clock 200 is adjusted, the timing between the subsequent clock nodes may be changed by y1. For example, the timing between the clock node of the second circuit logic and the third circuit logic may be changed by y1. Therefore, the timing between the subsequent clock nodes may need to be adjusted. In some embodiments, the processes at 64 and 65 may need to be performed to adjust the timing between subsequent clock nodes.

In the process at 64, a delay b between the clock node of the second circuit logic and the clock node of the third circuit logic may be reduced by y1 or the clock at the clock node at the second circuit logic may be increased by a delay y1.

In some embodiments, the delay b between the clock node 220 of the second circuit logic M2 and the clock node 230 of the third circuit logic M3 may be reduced by y1, that is, the delay between the clock node 220 and the clock node 230 becomes b−y1. For example, the number of buffers inserted between the clock node 220 of the second circuit logic M2 and the clock node 230 of the third circuit logic M3 may be reduced or the adjustment value of the clock adjuster between the clock node 220 and the clock node 230 may be adjusted, thereby reducing the delay b of the clock node 220 and the clock node 230 by y1.

In other embodiments, a delay y1 may be added to the clock at the clock node 220 of the second circuit logic M2. For example, a delay y1 may be added to the clock at the clock node at the second circuit logic M2 by increasing the number of buffers 202 inserted between the second circuit logic M2 and the clock node 220 of the second circuit logic M2 or by adjusting the adjustment value of the clock adjuster between the second circuit logic M2 and the clock node 220.

In the process at 65, a delay c from the clock node of the third circuit logic to the clock node of the fourth circuit logic may be reduced by y1 or a delay y1 may be added to the clock at the clock node at the third circuit logic.

In some embodiments, the delay c between the clock node 230 of the third circuit logic M3 and the clock node 240 of the fourth circuit logic M4 may be reduced by y1, that is, the delay between the clock node 230 and the clock node 240 becomes c−y1. For example, the number of buffers inserted between the clock node 230 and the clock node 240 may be reduced or the adjustment value of the clock adjuster between the clock node 230 and the clock node 240 may be adjusted, thereby reducing the delay c between the clock node 230 and the clock node 240 by y1.

In other embodiments, a delay y1 may be added to the clock at the clock node 230 of the third circuit logic M3. For example, a delay y1 may be added to the clock at the clock node at the fourth circuit logic M4 by increasing the number of buffers inserted between the third circuit logic M3 and the clock node 230 of the third circuit logic M3 or by adjusting the adjustment value of the clock adjuster between the third circuit logic M3 and the clock node 230.

In some embodiments, after the adjustment of the path of the timing violation from the k+1th circuit logic to the kth circuit logic is completed, the path of the timing violation from the k+2th circuit logic to the k+1th circuit logic may be further adjusted. For example, in the scenario shown in FIG. 2B, after the timing violation path from the second circuit logic M2 to the first circuit logic M1 is completely adjusted based on the method described in FIG. 6, the timing violation path between the third circuit logic M1 and the second circuit logic M2 may be further adjusted.

Figure 7:
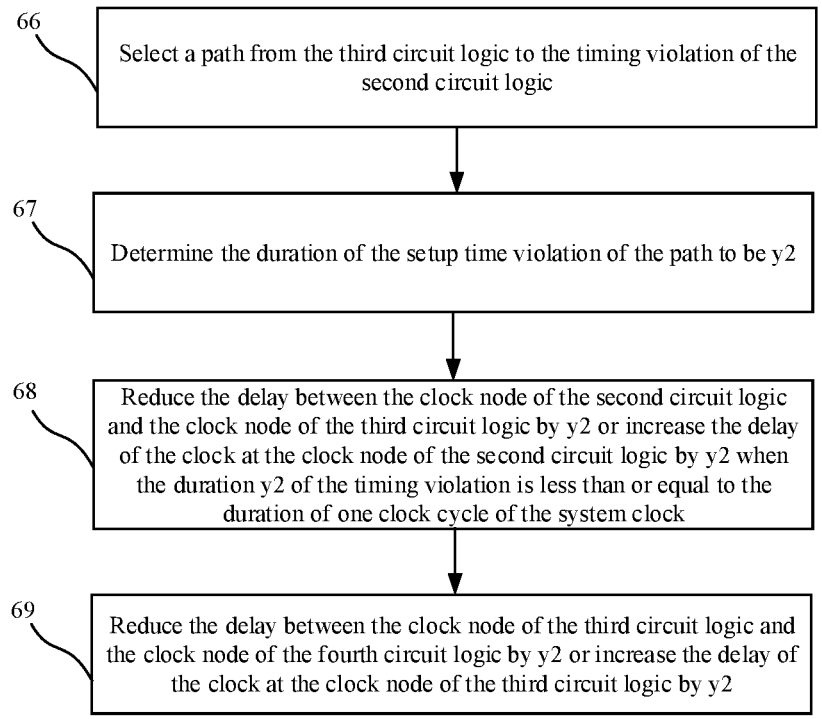
FIG. 7 is a flowchart of the method of the process at 40 according to an embodiment of the present disclosure.

FIG. 7 is a flowchart of the method of the process at 40 according to an embodiment of the present disclosure As shown in FIG. 7, in addition to the processes of 61-65 shown in FIG. 6, the process at 70 may further include processes 66-69. In some embodiments, the processes 66-49 may be performed after the process at 65.

In the process at 66, a path from the third circuit logic to the timing violation of the second circuit logic may be selected.

For example, in the scenario shown in FIG. 2B, a path from the third circuit logic M3 to the timing violation of the second circuit logic M2 may be selected. For example, a gate-level design file (e.g., a .ddc file) created by DC may be read to obtain a path from the third circuit logic M3 to the second circuit logic M2 with a timing violation from the gate-level design file.

In the process at 67, the duration of the setup time violation of the path may be determined to be y2, y2 being a length of time.

The process at 67 is similar to the process at 62 in FIG. 6, and details will not be repeated here.

In the process at 68, when the duration y2 of the timing violation is less than or equal to the duration of one clock cycle of the system clock, the delay from the clock node of the second circuit logic to the clock node of the third circuit logic may be reduced by y2 or the delay of the clock at the clock node at the second circuit logic may be increased by y2.

In some embodiments, the delay between the clock node 220 of the second circuit logic M2 and the clock node 230 of the third circuit logic M3 may be reduced by y2, that is, the delay between the clock node 220 and the clock node 230 becomes b−y1−y2. In some embodiments, the number of buffers inserted between the clock node 220 of the second circuit logic M2 and the clock node 230 of the third circuit logic M3 may be increased or the adjustment value of the clock adjuster between the clock node 220 and the clock node 230 may be adjusted to reduce the delay b between the clock node 220 and the clock node 230 by y2.

In other embodiments, a delay y2 may be added to the clock at the clock node 220 of the second circuit logic M2. For example, the number of buffers 202 inserted between the second circuit logic M2 and the clock node 220 of the second circuit logic M2 may be increased or the adjustment value of the clock adjuster between the second circuit logic M2 and the clock node 220 may be adjusted to increase the delay to the clock at the clock node at the second circuit logic M2 by y2.

a delay x2 may be added to the clock between the third circuit logic M3 and the clock node 230 corresponding to the third circuit logic M3 to increase the clock at the clock node at the third circuit logic M3 by x2.

In the process at 69, the delay between the clock node of the third circuit logic and the clock node of the fourth circuit logic may be further reduced by y2 or the clock at the clock node of the third circuit logic may be further increased by y2.

The process at 69 is similar to the process at 65 of FIG. 6 described above, and details will not be repeated here.

Figure 8:
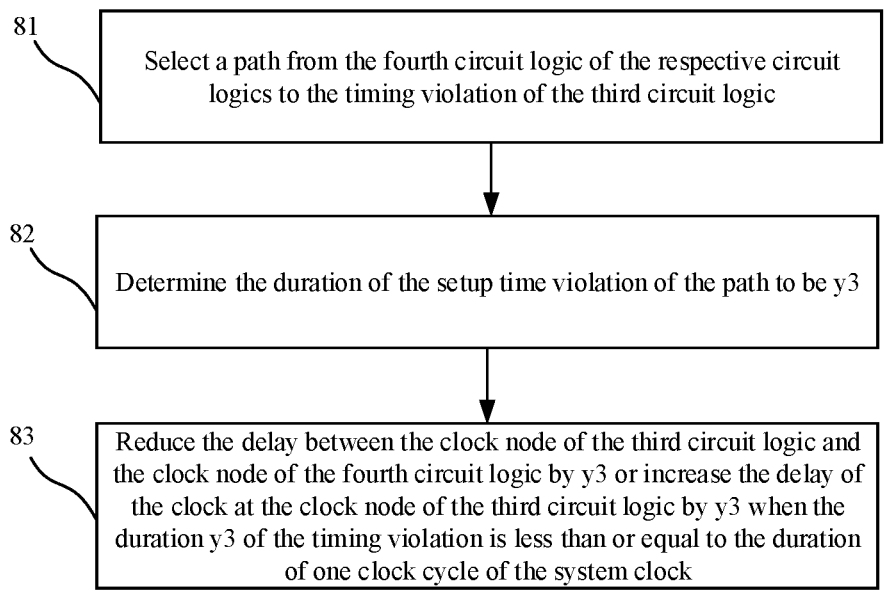
FIG. 8 is a flowchart of the method of the process at 40 according to an embodiment of the present disclosure.

FIG. 8 is a flowchart of the method of the process at 40 according to an embodiment of the present disclosure.

As shown in FIG. 8, based on the embodiment shown in FIG. 7, the process at 40 may further include processes 81-83. In some embodiments, the processes 81-83 may be performed after the process at 69.

In the process at 81, a path from the fourth circuit logic of the respective circuit logics to the timing violation of the third circuit logic may be selected.

For example, in the scenario shown in FIG. 2B, a path from the fourth circuit logic M4 to the timing violation of the third circuit logic M3 may be selected. For example, a gate-level design file (e.g., a .ddc file) created by DC may be read to obtain a path from the third circuit logic M3 to the fourth circuit logic M4 with a timing violation from the gate-level design file.

In the process at 82, the duration of the setup time violation of the path may be determined to be y3, y3 being a length of time.

In the process at 83, when the duration y3 of the timing violation is less than or equal to the duration of one clock cycle of the system clock, the delay between the clock node of the third circuit logic to the clock node of the fourth circuit logic may be reduced by y3 or the delay of the clock at the clock node at the third circuit logic may be increased by y3.

For details of the process at 83, reference can be made to the process at 65 described in FIG. 6, which will not be repeated here.

In other embodiments, if the duration y1 of the timing violation determined in the process at 62 of FIG. 6 is greater than the duration of one clock cycle of the system clock, the clock at the clock node at the first circuit logic may be increased by a delay y1. Correspondingly, the clock at the clock node at the second circuit logic may be increased by a delay y1, and the clock at the clock node at the third circuit logic may be increased by a delay y1.

For example, if the duration y1 of the timing violation is greater than the duration of one clock cycle of the system clock, the delay y1 may be applied to the clock path where each circuit logic is located. For example, adding a delay y1 for the clock at the clock node at the first circuit logic M1 may be to adding a delay y1 for the clock signal between the clock node 210 and the first circuit logic M1. Similarly, adding a delay y1 to the clock at the clock node at the second circuit logic M2 may be adding a delay y1 to the clock signal between the clock node 220 and the second circuit logic M2. Similarly, a delay y1 may be added to the clock at the clock node at the third circuit logic, which will not be repeated here.

In other embodiments, if it is determined in the process at 67 of FIG. 7 that y2 is greater than the duration of one clock cycle of the system clock, the clock at the clock node at the second circuit logic may be increased by a delay y2, and the clock at the clock node at the third circuit logic may be increased by a delay y2.

In other embodiments, if it is determined in the process at 82 of FIG. 8 that y3 is greater than the duration of one clock cycle of the system clock, the clock at the clock node at the third circuit logic may be increased by a delay y3.

Another aspect of the present disclosure provides a clock design system for at least two physical partition structures based on the same system clock.

Figure 9:
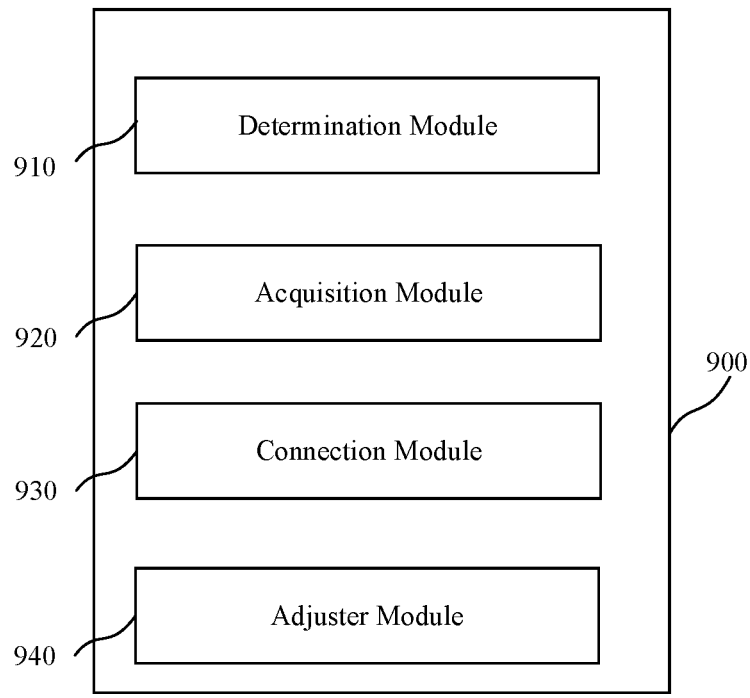
FIG. 9 is a schematic block diagram of a clock design system for at least two physical partition structures based on the same clock system according to an embodiment of the present disclosure.

FIG. 9 is a schematic block diagram of a clock design system for at least two physical partition structures based on the same clock system according to an embodiment of the present disclosure.

As shown in FIG. 9, a clock design system 900 includes a determination module 910, an acquisition module 920, a connection module 930 and an adjuster module 940.

The determination module 910 may be configured to determine the distance of each circuit logic from the system clock. In some embodiments, the determination module 910 may be configured to perform the process at 10 described with reference to FIG. 2A.

The acquisition module 920 may be configured to, based on the distance between each circuit logic and the system clock, obtain a plurality of clock nodes from the system clock to cause the delay of each clock node compared to the system clock to change with the distance from each circuit logic and the system clock, where the greater the distance, the greater the delay. In some embodiments, the acquisition module 920 may be configured to perform the process at 20 described with reference to FIG. 2A.

The connection module 930 may be configured to connect each circuit logic to the corresponding clock node based on the size of each circuit logic and the distance. In some embodiments, the connection module 930 may be configured to perform the process at 30 described with reference to FIG. 2A.

The adjuster module 940 may be configured to converge the timing of each circuit logic by adjusting the delay of each clock node compared to the system clock. In some embodiments, the adjuster module 940 may be configured to perform the process at 40 described with reference to FIG. 2A.

In some embodiments, the determination module 910, the acquisition module 920, the connection module 930 and the adjuster module 940 may be hardware, software, firmware and any feasible combination thereof. For example, the determination module 910, the acquisition module 920, the connection module 930 and the adjuster module 940 may be dedicated or general-purpose circuits, chips, devices, etc., or may be a combination of a processor and a memory. The specific implementation forms of the modules described above are not limited in the embodiments of the present disclosure.

It should be noted that in the embodiments of the present disclosure, each module in the clock design system 900 corresponds to each process of the aforementioned clock design method. For the specific functions of the clock design system 900, reference can be made to the relevant description of the clock design method, which will not be repeated here. The components and structures of the clock design system 900 shown in FIG. 9 is an example, and the present disclosure is not limited thereto. In addition, the clock design system 900 may also include other components and structures as needed.

Figure 10:
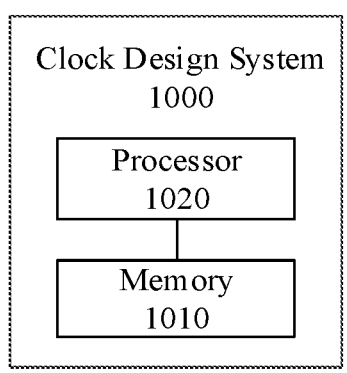
FIG. 10 is a schematic block diagram of another clock design system for at least two physical partition structures based on the same clock system according to an embodiment of the present disclosure.

FIG. 10 is a schematic block diagram of another clock design system for at least two physical partition structures based on the same clock system according to an embodiment of the present disclosure.

As shown in FIG. 10, a clock design system 1000 includes a memory 1010 and a processor 1020. The memory 1010 can be configured to store computer program instructions. The processor 1020 can be configured to execute the computer program instructions stored in the memory 1010. When executed by the processor 1020, the computer program instructions can cause the processor 1020 to determine the distance of each circuit logic from the system clock; based on the distance between each circuit logic and the system clock, obtain a plurality of clock nodes from the system clock to cause the delay of each clock node compared to the system clock to change with the distance from each circuit logic and the system clock, the greater the distance, the greater the delay; connect each circuit logic to the corresponding clock node based on the size of each circuit logic and the distance; and converge the timing of each circuit logic by adjusting the delay of each clock node compared to the system clock.

In some embodiments, the processor 1020 may be configured to perform various functions and/or processes described in the foregoing embodiments, and details will not be repeated here.

Figure 11:
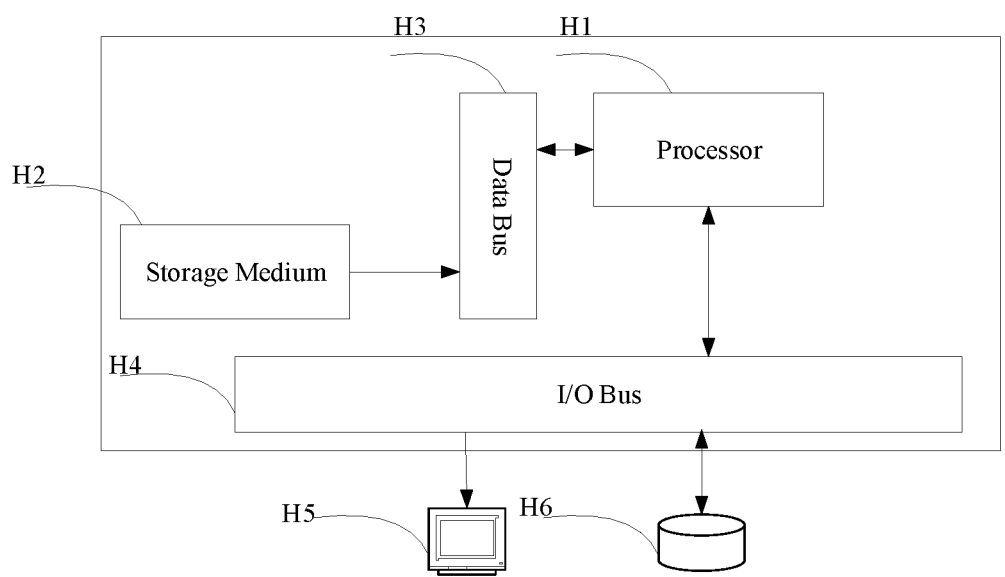
FIG. 11 is a schematic block diagram of an example computer system suitable for implementing the embodiments of the present disclosure.

FIG. 11 is a schematic block diagram of an example computer system suitable for implementing the embodiments of the present disclosure.

The computer system includes a processor (H1) and a memory (H2) coupled to the processor (H1). The memory (H2) can store computer-executable instructions for carrying out he steps of the various methods described in the embodiments of the present disclosure.

The processor (H1) may include, but is not limited to, one or more processors, microprocessors, etc.

The memory (H2) may include, but is not limited to, random-access memories (RAM), read-only memories (ROM), flash memories, EPROM memories, EEPROM memories, registers, and computer storage media (such as hard disks, floppy disks, solid state disks, removable disks, CD-ROMs, DVD-ROMs, Blu-ray discs, etc.).

In addition, the computer system may also include a data bus (H3), an input/output (I/O) bus (H4), a display (H5) and an input/output device (H6) (e.g., a keyboard, a mouse, a speaker, etc.).

The processor (H1) may be configured to communicate with external devices (H5, H6, etc.) via the I/O bus (H4) via a wired or wireless network (not shown in FIG. 11).

The memory (H2) may also store at least one computer-executable instruction for performing the various functions and/or steps of the methods in the in the embodiments of the present disclosure when the at least one computer-executable instruction is being executed by the processor (H1).

In some embodiments, the at least one computer-executable instruction may be compiled into or constitute a computer program software product. The one or more computer-executable instructions, when executed by a processor, can perform various functions and/or steps of the foregoing method embodiments.

Of course, the specific embodiments described above are only examples instead of limitations, and those skilled in the art can combine some steps and apparatuses in the foregoing embodiments, according to the concept of the present disclosure, to realize the effect of the present disclosure. Such embodiments obtained by such combinations are also included in the present disclosure, and such combinations will not be described one by one.

It should be noted that the advantages, benefits and effects described in the present disclosure are examples instead of limitations, and these advantages, benefits and effects are not considered to be necessarily required by various embodiments of the present disclosure. In addition, the specific details are disclosed above only for the purpose of illustration and convenience of understanding but not for limitation. These details will not restrict the present disclosure to be implemented by employing these details necessarily.

The block diagrams of the units, apparatuses, devices and system are just examples, the connection, placement and configuration illustrated in the block diagrams related to the present disclosure are not limited to these examples, and the units, apparatuses, devices and system may be connected, placed or configured in any way. The terms "comprise", "include" and "have" are open-form terms, which mean and may be changed into "include and is not limited to". The terms "or" and "and" mean and may be changed into "and/or", unless the context is clearly not. The term "such as" means and may be changed to "such as, but not limited to".

The flowchart and the method according to the present disclosure are just examples, and not limited to the steps in the embodiments. The steps of the embodiments may be performed in any order. The terms "next", "subsequently" and "then" are just for describing the present disclosure, and the present disclosure is not limited to these terms. Furthermore, the articles "a", "an" and "the" should not be limited to the singular element.

The steps or apparatuses of the present disclosure are described above. The above descriptions of the embodiments are just examples, and various modifications, replacements or combinations may be made without departing from the scope of the present disclosure, as defined by the appended claims, by persons skilled in the art.

The steps of the above method may be performed by any appropriate means that can perform the corresponding functions. The means may include any components and/or modules of hardware and/or software, and include but not be limited to a circuit, a dedicated application-specific integrated circuit (ASIC) or a processor.

The present disclosure may use a general-purpose processor, a digital signal processor (DSP), an ASIC, a field programmable gate array (FPGA) or other programmable logic device (PLD), a discrete gate or transistor logic, discrete hardware components or any other combination for executing the functions to realize the logic blocks, modules and circuits of the embodiments. The general-purpose processor is a micro-processor, and alternatively, the processor may be any processors, controllers, micro-controllers or state machines that can be obtained commercially. The processor may also be the combination of the computer equipment, such as the combination of a DSP and a micro-processor, the combination of plural micro-processors, or the combination of a DSP and plural micro-processors.

The steps of the method according to the present disclosure may be incorporated in the hardware, software modules executed by a processor or the combination of these two directly. The software modules may be stored in a recording medium with any shape. The examples of the recording medium include a random-access memory (RAM), a read-only memory (ROM), a flash memory, an EPROM memory, an EEPROM memory, a register, a hard disk drive, a removable disk, a CD-ROM, etc. The recording medium may be linked to a processor so that the processor reads information from the recording medium or writes information into the recording medium. Alternatively, the recording medium and the processor may also be a whole apparatus. The software module may be a single command or many commands, and may be distributed in several code segments, different programs or plural recording media.

Steps of the above method may be performed in time order, however the performing sequence is not limited to the time order. Any steps may be performed in parallel or independently.

The functions may be realized by hardware, software, firmware or any combination thereof. When the function is implemented by software, the function may be stored in a computer-readable medium as one or more commands. The recording medium may be any real medium that can be accessed by a computer. Such a computer-readable medium includes a RAM, a ROM, an EEPROM, a CD-ROM or other laser discs, a magnetic disk or other magnetic memory, or any other real media that carry or store commands, data or program codes and are accessed by the computer. Such disk and disc include a CD, a laser disc, an optical disc, a DVD disc, a floppy disk and a blue-ray disc, and the disk usually reproduces data and the disc reproduces data by a laser.

Thus, the operations may be performed by a computer program product. For example, such computer program product may be a tangible medium where computer-readable commands are stored (or coded), and the commands may be executed by one or more processors to perform the operation. The computer program product may include packaging material.

The software or commands may also be transmitted by a transmission medium. For example, a coaxial cable, an optical cable, a twisted cable, a digital subscriber line (DSL), or a transmission medium of the wireless technology of infrared, wireless or microwave may be used to transmit the software from a website, a server or another remote source.

Additionally, the modules and/or other appropriate means of the method or technology may be obtained from a user terminal and/or base station, or by other methods. For example, such equipment may be connected to a server so as to perform the transmission of the means of the above method. Alternatively, the methods may be provided via a storage unit (for example, a physical storage medium such as a RAM, a ROM, a CD or a floppy disc), so that the user terminal and/or the base station can obtain the methods when it is connected to the equipment. Furthermore, any other appropriate technology may be provided to the equipment by the method.

The present specification and the appended claims include other examples and implementations. For example, the above functions may be implemented by a processor, hardware, software, firmware, hard-wire or any combination thereof. The features for implementing the functions may be located at any physical position where which is distributed to each position physically. Furthermore, the term "or" before the term "at least one" means a separate enumerating, and for example, "at least one of A, B or C" means (1) A, B or C, (2) AB, AC or BC, or (3) ABC (namely, A and B and C). Additionally, the term "example" does not mean a preferable example or an example superior to other examples.

Various modifications, replacements or combinations may be made without departing from the scope of the present disclosure by persons skilled in the art. Furthermore, the scope of the present specification and the claims are not limited to the above processing, machine, manufacture, composition of events, means, method and operation. The processing, machine, manufacture, composition of events, means, method and operation with a similar function or a similar result may also be applied to the present disclosure. Therefore, the scope of the appended claims includes such processing, machine, manufacture, composition of events, means, method and operation.

Although the embodiments of the present disclosure have been shown and described above, it can be understood that the above embodiments are exemplary and should not be construed as limitations on the present disclosure. Those skilled in the art can change, modify, substitute, or vary the above embodiments within the scope of the present disclosure. The scope of the present disclosure is defined by the appended claims and their equivalents.

What is claimed is:

1. A clock design method for two or more physical partition structures based on a same system clock, the two or more physical partition structures including a first physical partition structure and a second physical partition structure, the first physical partition structure and the second physical partition structure including one or more circuit logics, part of the circuit logics' logical scale in the first physical partition structure being different from the part of the circuit logics' logical scale in the second physical partition structure, each circuit logic having its own clock tree, a clock being configured to enter the first physical partition structure from the system clock to the second physical partition structure through the first physical partition structure, the method comprising:

determining a distance of each circuit logic from the system clock;

based on the distance between each circuit logic and the system clock, obtaining a plurality of clock nodes from the system clock to cause a delay of each clock node compared to the system clock to change with the distance from each circuit logic and the system clock, the greater the distance, the greater the delay;

connecting each circuit logic to a corresponding clock node based on size of each circuit logic and the distance; and converging timing of each circuit logic by adjusting the delay of each clock node compared to the system clock, wherein converging timing of each circuit logic by adjusting the delay of each clock node compared to the system clock includes:

selecting a path with timing violations in a plurality of circuit logics and determining the circuit logics associated with the path;

determining a duration t1 of a setup time violation of the path;

adjusting the delay between the respective clock nodes of the circuit logics associated with the path or adjusting the clock delay at the respective clock nodes of at least part of the circuit logics associated with the path based on the duration t1 of the setup time violation.

2. The method of claim 1, wherein adjusting the delay between the respective clock nodes of the circuit logics associated with the path or adjusting the clock delay at the respective clock nodes of at least part of the circuit logics associated with the path based on the duration t1 of the setup time violation includes:

adjusting the delay between the respective clock nodes of the circuit logics associated with the path or adjusting the clock delay at the respective clock nodes of at least part of the circuit logics associated with the path when the duration t1 of the setup time violation is less than or equal to a duration of one clock cycle of the system clock; and adjusting the clock delay at the respective clock nodes of at least part of the circuit logics associated with the path when the duration t1 of the setup time violation is greater than the duration of one clock cycle of the system clock.

3. The method of claim 1, wherein:

the two or more physical partition structures include N circuit logics arranged in chronological order;

selecting the path with timing violations in the plurality of circuit logics and determining the circuit logics associated with the path includes:

selecting a path from a from a kth circuit logic to the timing violation of a k+1th circuit logic, the kth circuit logic and the k+1th circuit logic being circuit logics associated with the path;

adjusting the delay between the respective clock nodes of the circuit logics associated with the path or adjusting the clock delay at the respective clock nodes of the circuit logics associated with the path based on the duration t1 of the setup time violation includes:

increasing the delay between the clock node of the kth circuit logic to the clock node of the k+1th circuit logic by t1 or increasing the clock delay at the clock node of the k+1th circuit logic by t1; or, selecting the path with timing violations in the plurality of circuit logics and determining the circuit logics associated with the path includes:

selecting a path from a from the k+1th circuit logic to the timing violation of the kth circuit logic, the k+1th circuit logic and the kth circuit logic being circuit logics associated with the path;

adjusting the delay between the respective clock nodes of the circuit logics associated with the path or adjusting the clock delay at the respective clock nodes of the circuit logics associated with the path based on a duration t2 of the setup time violation includes:

reducing the delay from the clock node of the kth circuit logic to the clock node of the k+1th circuit logic by t2 or increasing the clock delay at the clock node of the kth circuit logic by t2, N being an integer greater than or equal to 2 and k being an integer greater than 0 and less than N.

4. The method of claim 3 further comprising:
when selecting the path from the kth circuit logic to the timing violation of the k+1th circuit logic, starting from the k+1th circuit logic, selecting a path of timing violation in adjacent two circuit logics in sequence; and
for the path of timing violation in each adjacent two circuit logics, increasing the delay between the clock node of the kth circuit logic to the clock node of the k+1th circuit logic by t1 or increasing the clock delay at the clock node of the k+1th circuit logic by t1 based on the duration t1 of the setup time violation; or,
when selecting the path from the k+1th circuit logic to the timing violation of the kth circuit logic, starting from the k+1th circuit logic, selecting a path of timing violation in adjacent two circuit logics in sequence; and
for the path of timing violation in each adjacent two circuit logics, reducing the delay from the clock node of the kth circuit logic to the clock node of the k+1th circuit logic by t2 or increasing the clock delay at the clock node of the kth circuit logic by t1 based on the duration t2 of the setup time violation.

5. The method of claim 1, wherein:
each circuit logic includes a first circuit logic, a second circuit logic, a third circuit logic and a fourth circuit logic arranged in sequential order; and
converging the timing of each circuit logic by adjusting the delay of each clock node compared to the system clock includes:
selecting a path from the first circuit logic to the timing violation of the second circuit logic;
determining the duration of the setup time violation of the path to be x1;
increasing a delay a between the clock node of the first circuit logic to the clock node of the second circuit logic by x1 or increasing the clock delay at the clock node at the second circuit logic by x1 when the duration x1 of the timing violation is less than or equal to the duration of one clock cycle of the system clock;
increasing a delay b between the clock node of the second circuit logic and the clock node of the third circuit logic by x1 or increasing the clock delay at the clock node at the third circuit logic by x1; and
increasing a delay c between the clock node of the third circuit logic and the clock node of the fourth circuit logic by x1 or increasing the clock delay at the clock node at the fourth circuit logic by x1, a, b, c and x1 being time lengths.

6. The method of claim 5, wherein converging the timing of each circuit logic by adjusting the delay of each clock node compared to the system clock further includes:
selecting a path from the second circuit logic in each circuit logic to the timing violation of the third circuit logic;
determining the duration of the setup time violation of the path to be x2;
increasing the delay between the clock node of the second circuit logic and the clock node of the third circuit logic by x2 or increasing the clock delay at the clock node at the third circuit logic by x2 when the duration x2 of the timing violation is less than or equal to the duration of one clock cycle of the system clock;
increasing the delay between the clock node of the third circuit logic and the clock node of the fourth circuit logic by x2 or increasing the clock delay at the clock node at the fourth circuit logic by x2, x2 being a time length.

7. The method of claim 6, wherein converging the timing of each circuit logic by adjusting the delay of each clock node compared to the system clock further includes:
selecting a path from the third circuit logic in each circuit logic to the timing violation of the fourth circuit logic;
determining the duration of the setup time violation of the path to be x3;
increasing the delay between the clock node of the third circuit logic and the clock node of the fourth circuit logic by x3 or increasing the clock delay at the clock node of the fourth circuit logic by x3 when the duration x3 of the timing violation is less than or equal to the duration of one clock cycle of the system clock, x3 being a time length.

8. The method of claim 5, wherein:
when the duration x1 of the timing violation is greater than the duration of one clock cycle of the system clock, a delay x1 is added to the clock at the clock node at the second circuit logic; the delay x1 is added to the clock at the clock node at the third circuit logic; and the delay x1 is added to the clock at the clock node at the fourth circuit logic.

9. The method of claim 1, wherein:
each circuit logic includes a first circuit logic, a second circuit logic, a third circuit logic and a fourth circuit logic arranged in sequential order; and
converging the timing of each circuit logic by adjusting the delay of each clock node compared to the system clock includes:
selecting a path from the second circuit logic to the timing violation of the first circuit logic;
determining the duration of the setup time violation of the path to be y1;
reducing the delay a between the clock node of the first circuit logic to the clock node of the second circuit logic by y1 or increasing the clock delay at the clock node at the first circuit logic by y1 when the duration y1 of the timing violation is less than or equal to the duration of one clock cycle of the system clock;
reducing the delay b between the clock node of the second circuit logic and the clock node of the third circuit logic by y1 or increasing the clock delay at the clock node at the second circuit logic by y1; and
reducing the delay c between the clock node of the third circuit logic and the clock node of the fourth circuit logic by y1 or increasing the clock delay at the clock node at the third circuit logic by y1, a, b, c and y1 being time lengths.

10. The method of claim 9, wherein converging the timing of each circuit logic by adjusting the delay of each clock node compared to the system clock further includes:
selecting a path from the third circuit logic to the timing violation of the second circuit logic;
determining the duration of the setup time violation of the path to be y2;
reducing the delay between the clock node of the second circuit logic and the clock node of the third circuit logic by y2 or increasing the clock delay at the clock node at the second circuit logic by y2 when the duration y2 of the timing violation is less than or equal to the duration of one clock cycle of the system clock;
increasing the delay between the clock node of the third circuit logic and the clock node of the fourth circuit logic by y2 or increasing the clock delay at the clock node at the third circuit logic by y2, y2 being a time length.

11. The method of claim 10, wherein converging the timing of each circuit logic by adjusting the delay of each clock node compared to the system clock further includes:
selecting a path from the fourth circuit logic in each circuit logic to the timing violation of the third circuit logic;
determining the duration of the setup time violation of the path to be y3;
reducing the delay between the clock node of the third circuit logic and the clock node of the fourth circuit logic by y3 or increasing the clock delay at the clock node of the third circuit logic by y3 when the duration y3 of the timing violation is less than or equal to the duration of one clock cycle of the system clock, y3 being a time length.

12. The method of claim 9, wherein:
when the duration y1 of the timing violation is greater than the duration of one clock cycle of the system clock, a delay y1 is added to the clock at the clock node at the first circuit logic; the delay y1 is added to the clock at the clock node at the second circuit logic; and the delay y1 is added to the clock at the clock node at the third circuit logic.

13. The method of claim 1, wherein:
the delay of the clock node compared to the system clock is adjusted by adjusting a number of buffers inserted between the system clock and the clock node or by adjusting an adjustment value of a clock adjuster inserted between the system clock and the clock node.

14. A clock design system for two or more physical partition structures based on a same system clock, the two or more physical partition structures including a first physical partition structure and a second physical partition structure, the first physical partition structure and the second physical partition structure including one or more circuit logics, part of the circuit logics' logical scale in the first physical partition structure being different from the part of the circuit logics' logical scale in the second physical partition structure, each circuit logic having its own clock tree, a clock being configured to enter the first physical partition structure from the system clock to the second physical partition structure through the first physical partition structure, the clock design system comprising:
a processor; and
a memory storing program instructions that, when being executed by the processor, cause the processor to:
determine a distance of each circuit logic from the system clock;
based on the distance between each circuit logic and the system clock, obtain a plurality of clock nodes from the system clock to cause a delay of each clock node compared to the system clock to change with the distance from each circuit logic and the system clock, the greater the distance, the greater the delay;
connect each circuit logic to a corresponding clock node based on size of each circuit logic and the distance; and
converge timing of each circuit logic by adjusting the delay of each clock node compared to the system clock, wherein each circuit logic includes a first circuit logic, a second circuit logic, a third circuit logic and a fourth circuit logic arranged in sequential order, and converging the timing of each circuit logic by adjusting the delay of each clock node compared to the system clock includes:
selecting a path from the first circuit logic to the timing violation of the second circuit logic;
determining the duration of the setup time violation of the path to be x1;
increasing a delay a between the clock node of the first circuit logic to the clock node of the second circuit logic by x1 or increasing the clock delay at the clock node at the second circuit logic by x1 when the duration x1 of the timing violation is less than or equal to the duration of one clock cycle of the system clock;
increasing a delay b between the clock node of the second circuit logic and the clock node of the third circuit logic by x1 or increasing the clock delay at the clock node at the third circuit logic by x1; and
increasing a delay c between the clock node of the third circuit logic and the clock node of the fourth circuit logic by x1 or increasing the clock delay at the clock node at the fourth circuit logic by x1, a, b, c and x1 being time lengths.

15. The system of claim 14, wherein converging the timing of each circuit logic by adjusting the delay of each clock node compared to the system clock further includes:
selecting a path from the second circuit logic in each circuit logic to the timing violation of the third circuit logic;
determining the duration of the setup time violation of the path to be x2;
increasing the delay between the clock node of the second circuit logic and the clock node of the third circuit logic by x2 or increasing the clock delay at the clock node at the third circuit logic by x2 when the duration x2 of the timing violation is less than or equal to the duration of one clock cycle of the system clock; and
increasing the delay between the clock node of the third circuit logic and the clock node of the fourth circuit logic by x2 or increasing the clock delay at the clock node at the fourth circuit logic by x2, x2 being a time length.

16. The system of claim 15, wherein converging the timing of each circuit logic by adjusting the delay of each clock node compared to the system clock further includes:
selecting a path from the third circuit logic in each circuit logic to the timing violation of the fourth circuit logic;
determining the duration of the setup time violation of the path to be x3; and
increasing the delay between the clock node of the third circuit logic and the clock node of the fourth circuit logic by x3 or increasing the clock delay at the clock node of the fourth circuit logic by x3 when the duration x3 of the timing violation is less than or equal to the duration of one clock cycle of the system clock, x3 being a time length.

17. The system of claim 14, wherein:
when the duration x1 of the timing violation is greater than the duration of one clock cycle of the system clock, a delay x1 is added to the clock at the clock node at the second circuit logic; the delay x1 is added to the clock at the clock node at the third circuit logic; and the delay x1 is added to the clock at the clock node at the fourth circuit logic.

18. A non-transitory computer readable storage medium storing a plurality of computer program codes that, when being executed by a processor, cause the processor to:
determine a distance of each circuit logic from a system clock;

based on the distance between each circuit logic and the system clock, obtain a plurality of clock nodes from the system clock to cause a delay of each clock node compared to the system clock to change with the distance from each circuit logic and the system clock, the greater the distance, the greater the delay;

connect each circuit logic to a corresponding clock node based on size of each circuit logic and the distance; and converge timing of each circuit logic by adjusting the delay of each clock node compared to the system clock, wherein converging timing of each circuit logic by adjusting the delay of each clock node compared to the system clock includes:

selecting a path with timing violations in a plurality of circuit logics and determining the circuit logics associated with the path;

determining a duration t1 of a setup time violation of the path;

adjusting the delay between the respective clock nodes of the circuit logics associated with the path or adjusting the clock delay at the respective clock nodes of at least part of the circuit logics associated with the path based on the duration t1 of the setup time violation.

* * * * *